(12) United States Patent
Rye

(10) Patent No.: US 9,003,690 B1
(45) Date of Patent: Apr. 14, 2015

(54) LINE GUIDING SPINNER LURE

(71) Applicant: Ryan Patrick Rye, Lawrenceville, GA (US)

(72) Inventor: Ryan Patrick Rye, Lawrenceville, GA (US)

( * ) Notice: Subject to any disclaimer, the term of this patent is extended or adjusted under 35 U.S.C. 154(b) by 86 days.

(21) Appl. No.: 13/932,029

(22) Filed: Jul. 1, 2013

(51) Int. Cl.
*A01K 85/10* (2006.01)
*A01K 85/12* (2006.01)

(52) U.S. Cl.
CPC *A01K 85/10* (2013.01); *A01K 85/12* (2013.01)

(58) Field of Classification Search
USPC .......... 43/42, 42.2, 42.15, 42.16, 42.51, 42.74
IPC ............................................. A01K 85/10,85/12
See application file for complete search history.

(56) References Cited

U.S. PATENT DOCUMENTS

| | | | |
|---|---|---|---|
| 3,996,688 A * | 12/1976 | Hardwicke, III | 43/42.09 |
| 4,453,334 A * | 6/1984 | Opperman et al. | 43/42.13 |
| 4,794,721 A * | 1/1989 | Rowe et al. | 43/42.14 |
| 4,823,495 A | 4/1989 | Camilleri | |
| 4,870,777 A * | 10/1989 | Morita | 43/42.74 |
| 5,022,177 A * | 6/1991 | Gibson | 43/42.11 |
| 5,113,614 A * | 5/1992 | Morita | 43/42.74 |
| 5,605,004 A * | 2/1997 | Boullt et al. | 43/42.13 |
| 6,041,538 A * | 3/2000 | Roemer | 43/42.06 |
| 6,108,961 A * | 8/2000 | Milawski et al. | 43/42.19 |
| 6,112,451 A * | 9/2000 | Webb | 43/42.19 |
| 7,437,849 B2 * | 10/2008 | Selvaggio | 43/42.05 |
| 7,467,491 B1 * | 12/2008 | Slocum | 43/42.13 |
| 2007/0169398 A1 * | 7/2007 | Taszarek | 43/42.19 |
| 2007/0277423 A1 * | 12/2007 | Edwards | 43/42.13 |
| 2008/0066370 A1 | 3/2008 | Wichern | |
| 2010/0263258 A1 * | 10/2010 | Hinz | 43/42.13 |

\* cited by examiner

*Primary Examiner* — Christopher Harmon

(57) ABSTRACT

A line guiding spinner lure is comprised of a line guide coupled to a wire form member frame, with at least one hook and spinner attached. The line guide optimally routes the fishing line from the line attachment means of a first spinner lure to a second trailing lure, eliminating line entanglement during casting and preventing spinner interference during retrieval of a multi-lure rig. The line guide can be a separately attached part, or it can be formed from a section of the wire form member itself. The line guide can be made from a metallic, elastomeric, or plastic material. The line guide feature provides a means for an angler to easily rig a trailing lure at a desired distance behind a line guiding spinner lure, significantly increasing the probability for both attracting and catching multiple fish on a single cast.

10 Claims, 8 Drawing Sheets

LINE GUIDING SPINNER LURE

BACKGROUND INFORMATION

This disclosure relates to spinner fishing lures. More specifically, this disclosure relates to a spinner lure with a built-in line guide element. The line guide provides a means for easy and tangle-free rigging of a second trailing lure behind a line guiding spinner lure.

The basic construction of spinner lures is well known. A generally V-shaped, U-shaped, or straight wire form member defines the frame of the spinner lure. This frame is comprised of three primary features: a fishing line attachment means, a hook attachment means, and a spinner attachment means. Additionally attaching at least one hook and at least one spinner or "blade" to the frame completes the minimum amount of construction required to define a spinner lure. A head is then often attached to vary the casting distance of the lure and the underwater depth at which the lure can be retrieved. An optional soft elastomeric body is frequently added to further attract fish and help conceal the hook. A major drawback of the common spinner lure is that it does not comprise a means for easily rigging a trailing lure in series along a common fishing line. For the sake of this invention, the terms "lure in series" and "series of lures" should be understood to mean "a second lure following behind a first spinner lure while attached to the same unbroken fishing line."

If an angler attempts to rig a trailing lure behind a common spinner lure by simply tying two spinner lures a few feet apart along a common fishing line, then two major problems are readily experienced. First, the section of line between the first spinner lure and trailing lure becomes entangled with the frame of the first spinner lure as the rig of both lures is cast by an angler. Second, the section of line between the first spinner lure and trailing lure interferes with the steady rotation of the spinner or blade of the first spinner lure during retrieval of the multiple-lure rig.

US 21080066370 describes a fish hook with a top eyelet and a bottom eyelet. Attempting to integrate such a double eyelet hook into a spinner lure and then attaching a trailing lure in a daisy chain fashion—by tying a main line to the spinner lure top hook eyelet and then a leader from the bottom hook eyelet to a trailing lure—would create several disadvantages. First, the angler would need to tie two knots instead of just one at every in-line "double-eyelet hook" location along the chain of lures, making preparation of a multiple-lure rig cumbersome and annoying. Another disadvantage of the double-eyelet hook is that because the second eyelet is made from the same thickness as the hook shank and sits at the bottom or behind the hook shank, the bulky second eyelet would interfere with and prevent the easy slide-on attachment of pre-existing soft body trailers onto the hook shank.

There exists the need for a new and improved type of spinner lure with an integrated line guide element. The novel line guide feature creates non-obvious advantages with regards to the in-line rigging, casting, and retrieval problems discussed above.

SUMMARY OF THE INVENTION

The line guiding spinner lure consists of the common features found in known spinner lure lures—a wire form member comprising a hook attachment means, spinner attachment means, and line attachment means—but with a line guide element coupled to the wire form member. A line guide more efficiently routes a fishing line from a first lure to a trailing lure by preventing the trailing portion of a fishing line from becoming entangled with nearby hooks or spinners. The line guide can be a separately attached tubular or ring-shaped part, or the line guide can simply be a coiled or looped portion of the wire form member itself. A separately attached line guide can be coupled to the wire form member during the overmolding or casting of a head that encompasses a portion of both the line guide and wire form member. A line guide is preferably made of metal, but could also be made of an elastomeric or plastic material. A line guide consists of a forward first opening and a rearward second opening. The first opening of a line guide can extend in front of the line attachment means to protect a fishing line knot. The second opening of a line guide can extend beyond the hook attachment means to desirably route the fishing line further away from a larger spinner or nearby hook barb.

Objects and advantages of the line guiding spinner lure are as follows:

1. A line guiding spinner lure provides a means for an angler to easily rig a trailing lure at a predetermined distance behind the line guiding spinner lure, increasing the probability for both attracting and catching multiple fish on a single cast.
2. A line guiding spinner lure prevents line entanglement with its own hook during casting of a multiple-lure rig.
3. A line guiding spinner lure prevents rotational interference between its rotating spinner and the trailing fishing line during retrieval of a multi-lure rig.
4. A line guiding spinner lure prevents fishing line abrasion as the lure makes contact with underwater objects during retrieval.
5. A line guiding spinner lure minimizes the number of knots needing to be tied when rigging multiple line guiding spinner lures in series along a single fishing line.
6. A line guiding spinner lure can provide the necessary clearance for the slide-on attachment of existing soft body trailers used on spinner lures today.

These and other objects and advantages will become readily apparent upon review of the following specification and drawings.

DRAWINGS

Reference Numerals

- 20 line guiding spinner lure
- 30 first leg
- 40 second leg
- 50 fishing line
- 60 knot
- 70 line guide
- 80 first opening
- 90 second opening
- 100 hook
- 110 spinner
- 120 barb
- 130 swivel
- 140 head
- 150 trailing lure
- 160 elastomeric body
- 170 coiled section
- 180 guide eye
- 190 first distal end
- 200 second distal end
- 210 apex
- 220 shank
- 230 bend
- 240 point

DETAILED DESCRIPTION OF PREFERRED EMBODIMENTS

Figure 1:
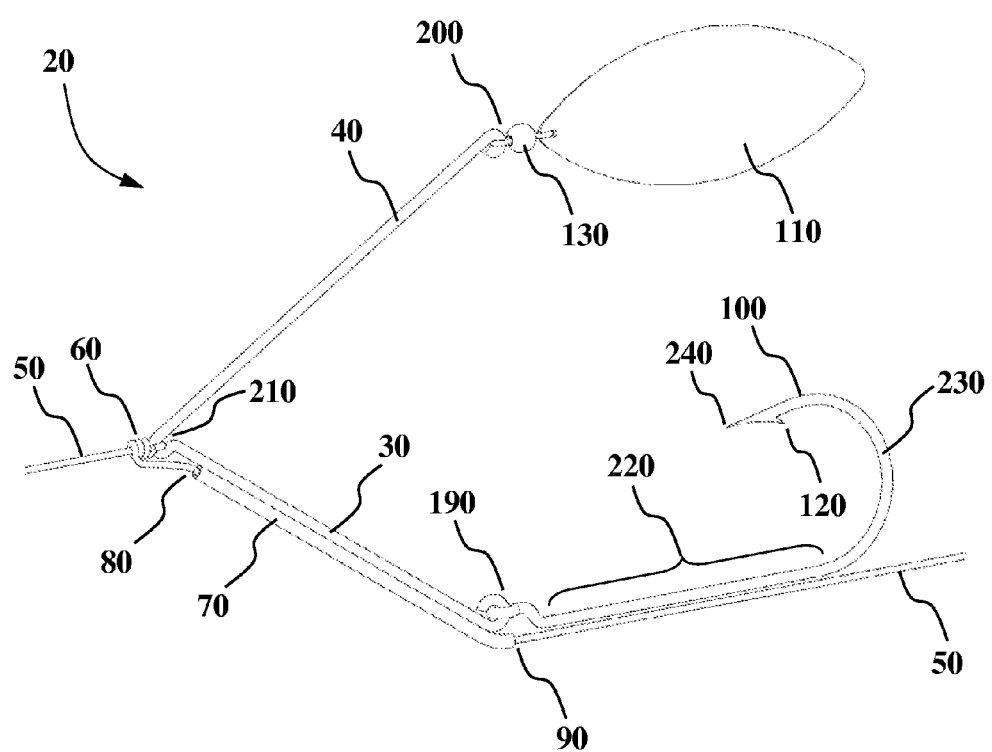
FIG. 1 is a diagrammatic perspective view of a first preferred embodiment of a line guiding spinner lure wherein the line guide is rigidly attached to a wire form member frame. A fishing line is shown tied to the lure and threaded through the line guide.

FIG. 1 illustrates a first preferred embodiment of a line guiding spinner lure 20. A generally V-shaped wire form member is comprised of a first leg 30 and a second leg 40. The V-shaped wire form member is commonly made from stainless steel wire but can be made of any strong wire material. A line attachment means allows a fishing line 50 to be tied to the wire form member. An eyelet and R-shaped bend in the wire form member, to which a fishing line knot 60 is tied, are both examples of a line attachment means. The first leg 30 further comprises a first distal end 190, and the second leg 40 further comprises a second distal end 200. The line attachment means is generally located at an apex 210 of the wire form member, and the apex 210 is defined as the junction between the first leg 30 and second leg 40. The first distal end 190 is a point along the first leg 30 that is located generally farthest away from the apex 210, while the second distal end 200 is a point along the second leg 40 that is located generally farthest away from the apex 210. Beginning generally near the apex 210, a line guide 70 is located adjacent to the first leg 30 and is rigidly attached to the first leg 30 through a guide attachment means. A rigid type of guide attachment means can be a weld joint, solder joint, braze joint, glue joint, or other common rigid joining method known in the art. A more flexible guide attachment means can be a rubber adhesive or dip coating that encapsulates portions of the first leg 30 and line guide 70, or an elastomeric band or heat shrink tubing can be used to secure the line guide 70 to the first leg 30. The line guide 70 comprises a first opening 80 and a second opening 90, through which the fishing line 50 below the knot 60 is passed, and the line guide 70 is generally tubular in shape. It should be noted that the first opening 80 is desirably located in front of the barb 120 of the hook 100 in order to eliminate trailing line entanglement issues with the barb 120, wire form member frame, spinner 110, or other soft body attachment. A hook attachment means pivotally couples a hook 100 to the wire form member, and a spinner attachment means couples a spinner 110 to the wire form member. The common shape of a fish hook 100 is well known, and comprises a generally elongated shank 220 transitioning into a bend 230 and terminating in a sharp point 240. An example of a hook attachment means is an interlocking eyelet joint pivotally linking a hook 100 and the first leg 30 of the wire form member, as shown in FIG. 1. An example of a spinner attachment means in FIG. 1 is shown in the form of a swivel 130. Alternatively, the spinner attachment means can consist of the second leg 40 passing through a hole in the spinner 110 itself, with the spinner then being slidably constrained along—and free to spin around—the second leg 40. Although these are the most common means for attaching a hook 100 and spinner 110 to a spinner lure, other coupling methods can be used by those skilled in the art.

Figure 2:
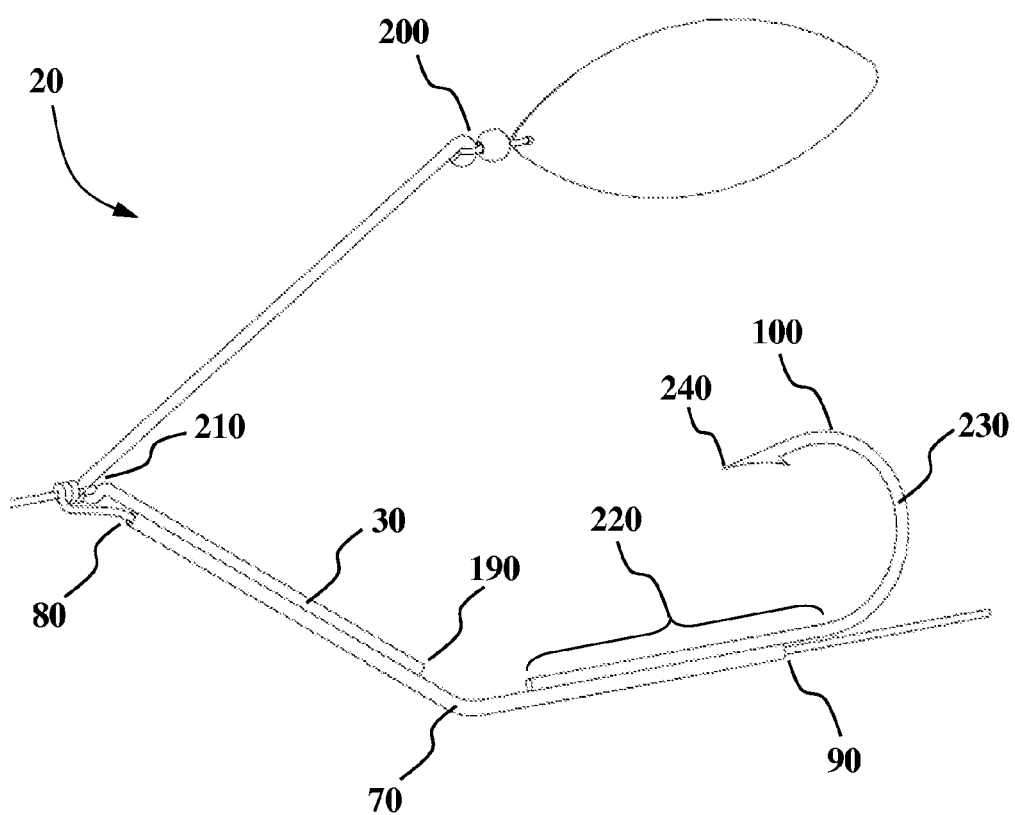
FIG. 2 is a diagrammatic perspective view of a second preferred embodiment of a line guiding spinner lure.

FIG. 2 depicts a second preferred embodiment, wherein a hook attachment means now consists of a rigid connection between the hook 100 and line guide 70. A guide attachment means rigidly connects the line guide 70 to the first leg 30 of the wire form member. Through the rigid hook attachment means and the rigid guide attachment means, the hook 100 of FIG. 2 is indirectly, yet still rigidly, coupled to the first leg 30, unlike the pivotally coupled hook 100 of FIG. 1. FIG. 2 depicts the first opening 80 of the line guide 70 being located in front of, or on a first side of, the first distal end 190. The second opening 90 of the line guide is generally located behind, or on an opposite side of, the first distal end 190. In addition, FIG. 2 illustrates the line guide 70 being adjacent to substantially most of the length of the first leg 30.

Figure 3:
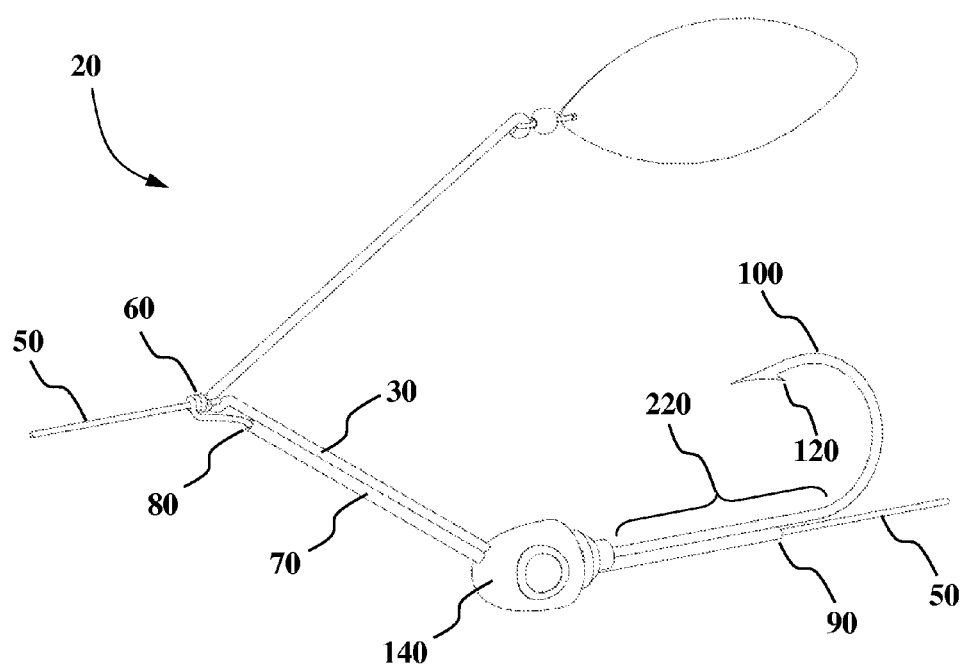
FIG. 3 is a diagrammatic perspective view of a third preferred embodiment of a line guiding spinner lure with a head attached.

FIG. 3 is a third preferred embodiment, wherein a head 140 is connected through a head attachment means. A common head attachment means is melting and then molding a metal, plastic, or elastomeric material over the joint connecting the hook 100 and first leg 30 of the wire form member, but other methods may be used. A head attachment means can additionally be used to simultaneously secure the line guide 70 onto the first leg 30 position by having an over-molded head 140 also encapsulate a section of the line guide 70. It should be noted that the weight of the line guide 70 of FIG. 1 and FIG. 2 can be sufficient enough for desired lure behavior such that no head 140 is needed. However, an additional weight in the form of a head 140 can provide for increased casting distances and greater retrieval depths. In FIG. 3, the head 140 envelops a section of the line guide 70 such that the line guide 70 passes through the head 140. However, the line guide 70 may also be positioned below, above, or beside the head 140, and such a line guide 70 can be secured to the head 140 through an elastomeric attachment means.

Note that in the rigid construction of FIG. 2 and FIG. 3, the second opening 90 is optimally located further along, or substantially adjacent to, the shank 220 of the hook 100 in order to direct the trailing fishing line 50 away from a nearby barb 120 of the hook 100.

Figure 4:
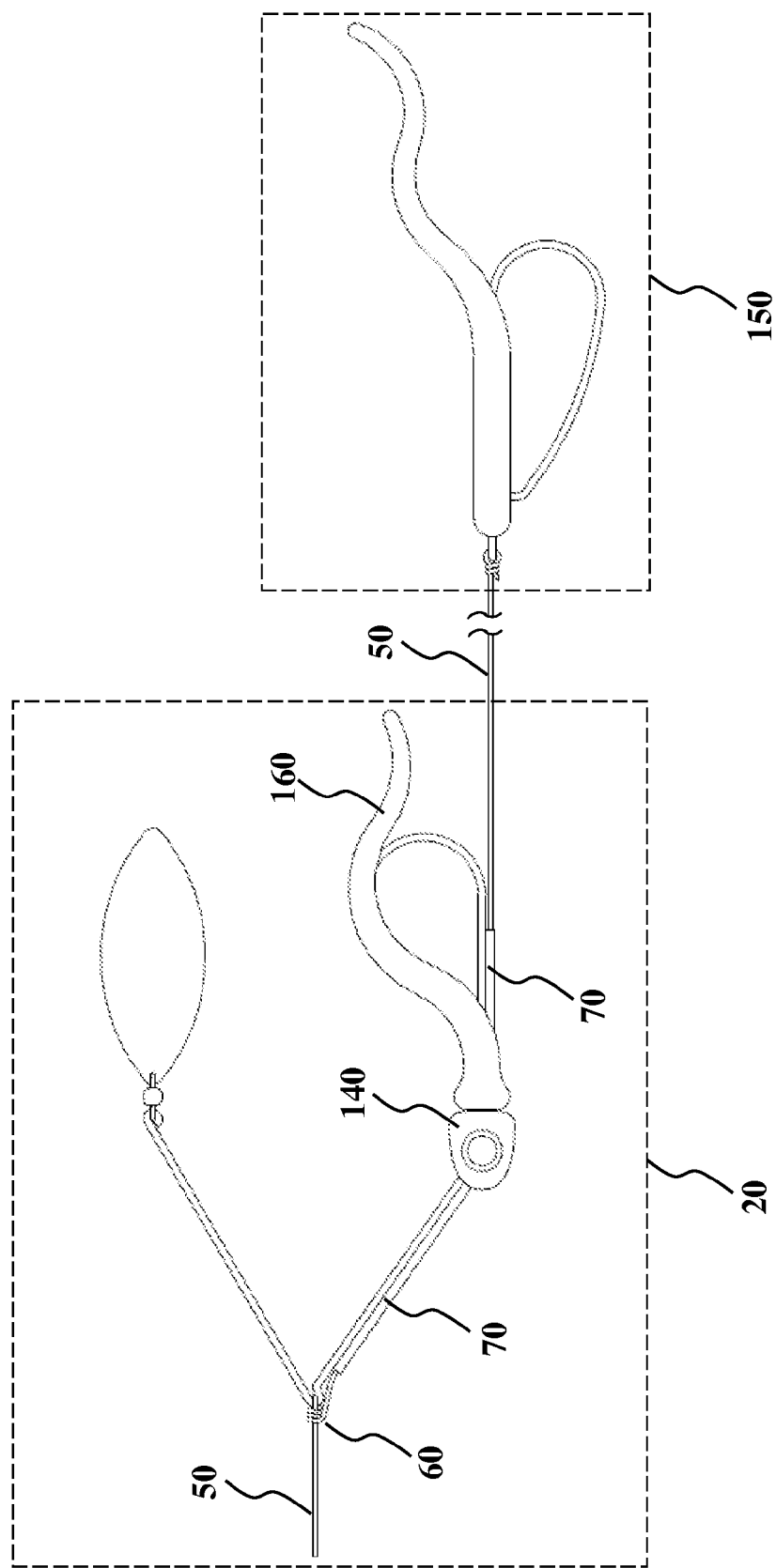
FIG. 4 is a diagrammatic side view of a fourth preferred embodiment of a line guiding spinner lure connected to a second trailing lure, illustrating how the line guiding spinner lure creates a means for any trailing lure to be rigged in series along a single fishing line.

A novel advantage of a line guiding spinner lure is shown in FIG. 4, which demonstrates how a line guiding spinner lure 20 can be rigged to any type of trailing lure 150 along the same unbroken fishing line 50. Although any line guiding spinner lure 20 can be fished alone, FIG. 4 illustrates the innovative advantage of a line guiding spinner lure 20 by allowing anglers to easily cast and retrieve at least two lures tied to the same line. To construct a two-lure rig, the fishing line 50 is first tied to a line attachment means of the line guiding spinner lure 20, while the remaining trailing portion of fishing line 50 below the knot 60 is then passed through the line guide 70 and tied to a trailing lure 150. The line guide 70 desirably causes a bend in the fishing line 50 at a location behind the line attachment means in order to redirect the line away from a spinner 110 and hook barb 120. The line guiding spinner lure 20 is desirably tied to a predetermined location along a fishing line 50 in order to avoid sliding into and entangling with the adjacent trailing lure 150. This type of rig allows an angler to choose desired lure spacing between the line guiding spinner lure 20 and a trailing lure 150. A predetermined spacing and weight difference between lures allows an angler to fish each lure at different depths by using a slower retrieve and/or a heavier trailing lure 150, or an angler can fish both lures along a similar water depth through a faster retrieve and/or a heavier line guiding spinner lure 20. When rigging an "n" number of lures in this series fashion, whether for casting or for trolling, an angler would need for at least "n–1" spinner lures to contain a line guide 70. Also, if the rig were cast and not trolled, one way to further insure against any line entanglements when casting into the wind would be to require any given lure in the rig to always weigh less than the lure trailing behind it. For example, if casting a rig of three lures, then at least the front lure and middle lure would be a line guiding spinner lure 20. For such windy conditions, the front lure would desirably weigh less than the middle lure, and the middle lure would desirably weigh less than the trailing or terminal lure. The front and middle lures can desirably not include a head 140 in order to further reduce lure weight and lessen the probability of reel backlash or line entanglements during casting. It should be noted that in FIG. 4, an example of a common elastomeric body 160 is shown secured to the head 140. While the elastomeric body 160 can also be attached to the first leg 30 or hook 100, sliding the elastomeric body 160 over a barb-like feature of the head 140 is the most common body attachment means. The addition of this elastomeric body 160 completes a fourth preferred embodiment of a line guiding spinner lure 20.

Figure 5:
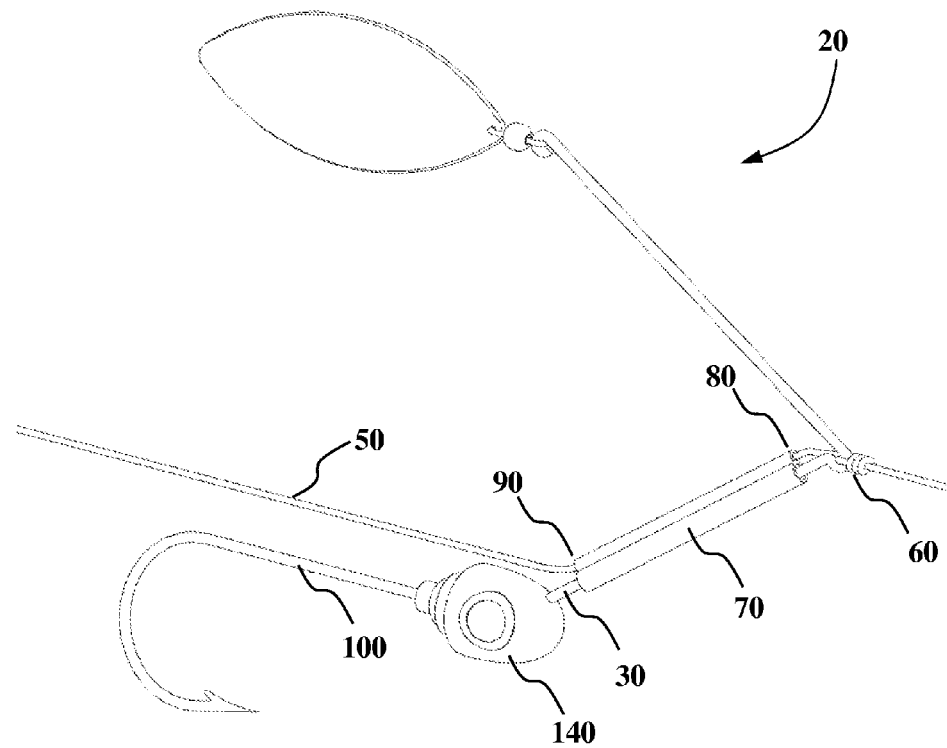
FIG. 5 is a diagrammatic perspective view of a fifth preferred embodiment of a line guiding spinner lure wherein a line guide is freely sliding along and freely pivoting around a first leg of the wire form member frame.

FIG. 5 illustrates a fifth preferred embodiment of a line guiding spinner lure 20, wherein the line guide 70 is slidably coupled to the wire form member. The guide attachment means is a pivotable sleeve attached to the first leg 30. The first opening 80 is slidably constrained by the line attachment means, and the second opening 90 is slidably constrained by the hook attachment means. The advantage of this preferred embodiment is that no secondary welding or gluing process is required to attach the line guide 70 to the first leg 30 of the wire form member. Because the first leg 30 passes axially through the line guide 70, the line guide 70 is free to spin or pivot partially around the first leg 30. One can easily envision further adding fish attracting elements to the line guide 70 such as a rattle and a common oscillator bill or nose, which together can result in an oscillating movement and rattling noise as the lure is retrieved. Another example of a fish attracting element can be a faceted or reflective surface on the line guide 70 in order to simulate the scales of a swimming minnow. Additionally, the line guide 70 can be painted any predetermined color for attracting fish in various clarifies of water and during different seasons of the year.

Figure 6:
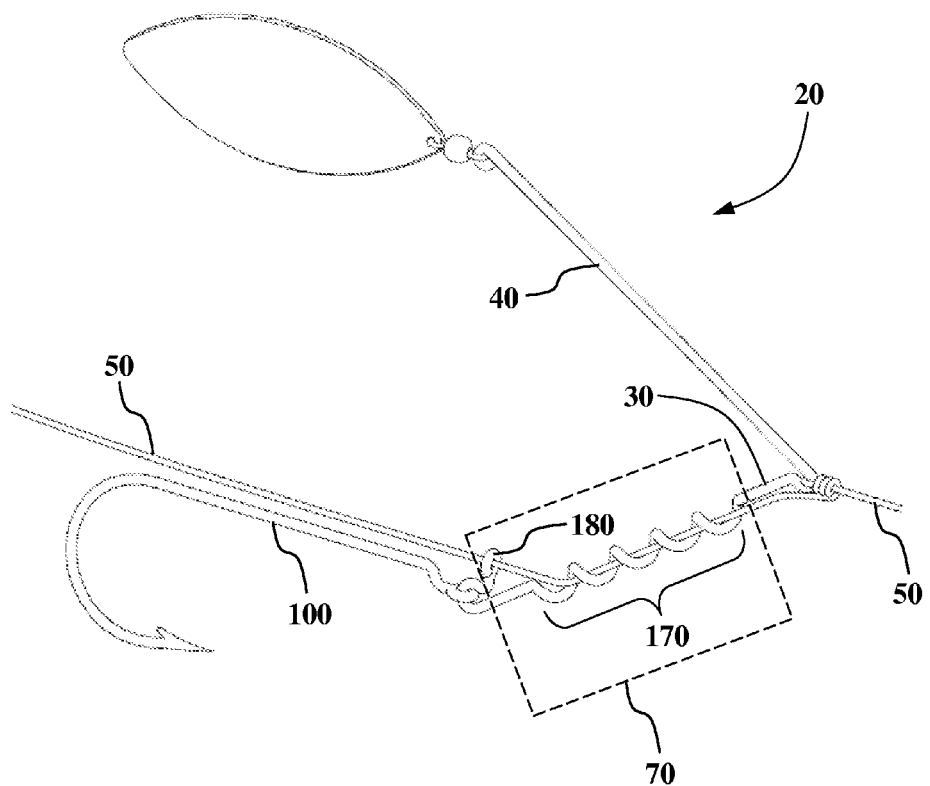
FIG. 6 is a diagrammatic perspective view of a sixth preferred embodiment of a line guiding spinner lure wherein the line guide is formed from a portion of the wire form member itself.
Figure 7:
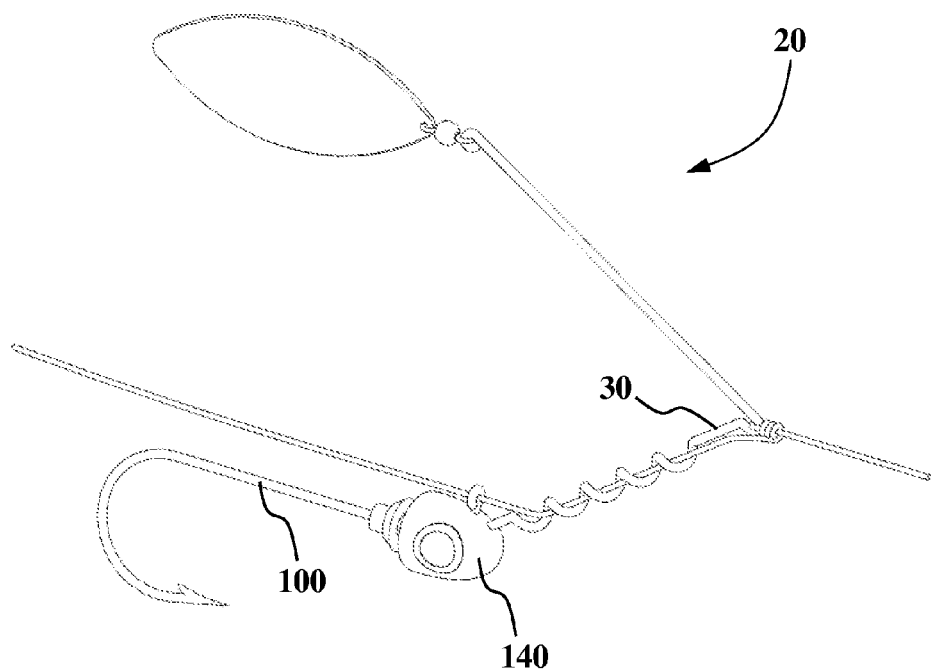
FIG. 7 is a diagrammatic perspective view of a seventh preferred embodiment of a line guiding spinner lure similar to that of FIG. 6, but with a head attached in order to create a rigid hook attachment means instead of pivotable hook attachment means.

FIG. 6 illustrates a sixth preferred embodiment for a line guiding spinner lure 20, revealing how the line guide 70 can be formed by a first leg 30 and not be a separately attached part as in previous preferred embodiments. A portion of the first leg 30 is shaped into a coiled section 170, and a guide eye 180 of the first leg 30 is formed near the front end of the hook 100. The coiled section 170 and guide eye 180 together form the line guide 70 of FIG. 6. It should be noted that although both the coiled section 170 and guide eye 180 are shown in this preferred embodiment, they are not required to exist together. In other words, at least either the coiled section 170 or guide eye 180—but not necessarily both—is required for a one-piece preferred embodiment of a line guiding spinner lure 20. The coiled section 170 protects the fishing line 50 from abrasion and impact with underwater objects during lure retrieval. If the coiled section 170 of the first leg 30 is substantially long or thick such that trailing vortices create imbalanced forces on the lure during retrieval, then a portion of the second leg 40 may also be coiled in an opposite helical direction in order to offset any such sideways force being experienced by the first leg 30. Again, the advantage of this preferred embodiment over earlier preferred embodiments is that the preferred embodiment of FIG. 6 does not require the line guide 70 to be a separate part. While the hook 100 is pivotally coupled to the wire form member in FIG. 6, the addition of an over-molded metal head 140 can provide a rigid version of a hook attachment means that secures the hook 100 and first leg 30 together, as shown in the head-equipped seventh preferred embodiment of a line guiding spinner lure 20 of FIG. 7.

Figure 8:
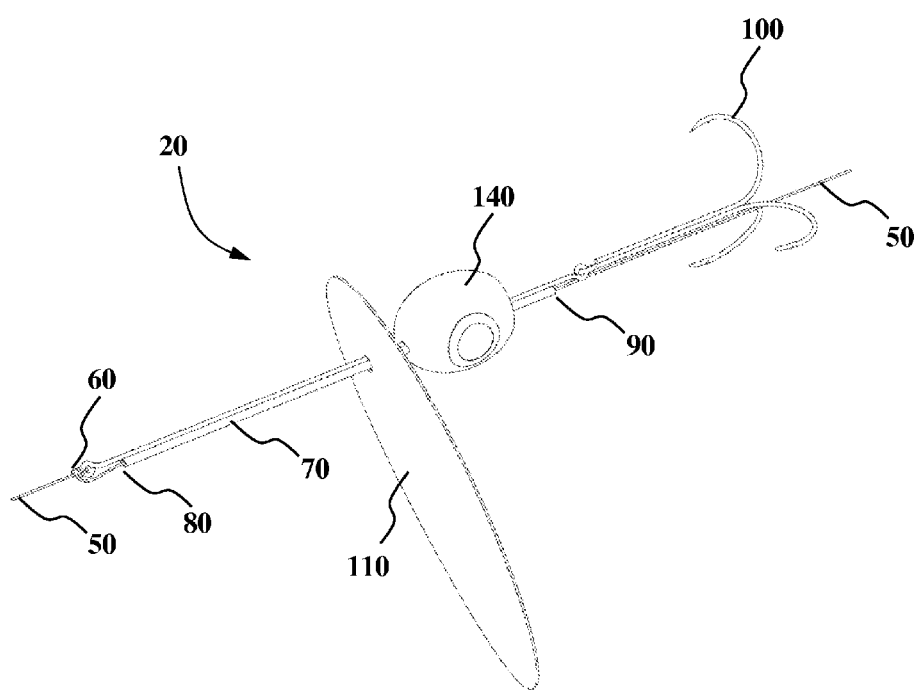
FIG. 8 is a diagrammatic perspective view of an eighth preferred embodiment of a line guiding spinner lure, wherein the wire form member frame is generally straight.

FIG. 8 illustrates an eighth preferred embodiment for a line guiding spinner lure 20 utilizing a straight wire form member instead of a V-shaped wire form member. A line guide 70 is rigidly attached adjacent to a straight wire form member, and a head 140 can be attached at a predetermined location along the wire form member. The head 140 can envelop a portion of both the wire form member and the line guide 70. The wire form member and line guide 70 pass through a hole in the spinner 110, and the spinner 110 rotates as the lure is retrieved. The fishing line 50 is tied to the front of the lure at the knot 60 location, and the trailing portion of the fishing line 150 passes through the line guide 70 and onto a trailing lure.

It should be understood that there are many obvious variations of the preferred embodiments described herein. For example, while the material of a line guide 70 is preferably metal, it could also be made from plastic, an elastomer, and any combination thereof. More than one line guide 70 can be attached to any portion of a wire form member. A first opening 80 can extend forward to partially surround and protect the knot 60 tied to the line guiding spinner lure 20. A first opening 80 or second opening 90 can be flared open to reduce stress on the fishing line 50 if two or more hooked fish are pulling a chain of lures in opposite directions. Alternatively, a slit can extend from a first opening 80 to a second opening 90 in order to provide a means for releasing a taut fishing line 50 from a line guide 70 if two or more fish are pulling a rig of lures in different directions, thus preventing the fishing line 50 from breaking. A portion of the exterior surface of a line guide 70 can be shaped like a diving bill in order to cause the line guiding spinner lure 20 to dive deeper into the water or oscillate when the lure is retrieved. When made from an elastomer, a line guide 70 can contain additional fish attracting elements in the form of flared strands resembling tentacles that sway and pulsate under water during lure retrieval, eliminating the need for a separately-attached elastomeric body 160. Additional beads, swivels, devises, snap rings, spacers, coil spring soft body mounts, and other small lure-making components can be included when creating a line guiding spinner lure 20. A spinner 110 can be any common blade shape used on spinner lures today, or the spinner 110 can be a freely rotating propeller or vaned element. It should also be noted that a head 140 can be of the weighted or floating type, and the head 140 can also be coupled entirely onto the shank of the hook 100 or entirely onto the first leg 30 of the wire form member.

As a result of the novel line guide 70, an angler now can easily rig and fish a trailing lure behind a line guiding spinner lure 20. He or she has more chances than ever before of attracting and catching multiple fish on a single cast.

While certain preferred embodiments have been described and shown in the accompanying drawings, it is to be understood that such preferred embodiments are merely illustrative of, and not restrictive on, the broad invention. Furthermore, it is to be understood that this invention shall not be limited to the preferred embodiments shown and described, as various modifications or changes will be apparent to those of ordinary skill in the art without departing from the spirit and scope of the preferred embodiments as claimed. It is intended that the scope of the invention be defined by the following claims and their equivalents.

What is claimed is:

1. A spinner lure, comprising:
    a wire form member;
        wherein said wire form member further comprises at least one line attachment means for tying a fishing line thereto;
    a spinner attachment means for rotatably coupling at least one spinner to said wire form member;
    a hook attachment means for coupling at least one hook to said wire form member;
    a guide attachment means for coupling at least one line guide to said wire form member;
        wherein said line guide further comprises a first opening and a second opening for the passage of said fishing line through said line guide;
        wherein said first opening is generally located in front of a barb of said hook.

2. A spinner lure in accordance with claim 1 further comprising a head attachment means for coupling a head to said wire form member.

3. A spinner lure in accordance with claim 1 further comprising a body attachment means for coupling an elastomeric body to said wire form member.

4. A spinner lure in accordance with claim 1 wherein said wire form member is generally V-shaped and comprises a first leg and a second leg.

5. A spinner lure in accordance with claim 1 wherein said line guide is generally tubular in shape.

6. A spinner lure in accordance with claim 1 wherein said line guide further comprises at least one fish attracting element.

7. A spinner lure, comprising:
    a wire form member;
        wherein said wire form member is generally V-shaped and comprises a first leg and a second leg;
        wherein said wire form member is adapted to have a fishing line tied thereto at an apex, said apex generally located at the junction of said first leg and said second leg;
        wherein said first leg has a first distal end and said second leg has a second distal end;
    at least one hook coupled to said first leg;
    at least one spinner rotatably coupled to said second leg;
    at least one line guide coupled to said first leg;
        wherein said line guide has a generally elongated tubular shape and further comprises a first opening and a second opening for the passage of said fishing line through said line guide;
        wherein said first opening is generally located on a first side of said first distal end;
        wherein said second opening is generally located on an opposite side of said first distal end;
        wherein said second opening is also located generally adjacent to a shank of said hook.

8. A spinner lure in accordance with claim 7 further comprising a head coupled to said wire form member.

9. A spinner lure in accordance with claim 7 further comprising an elastomeric body coupled to said wire form member.

10. A spinner lure in accordance with claim 7 wherein said line guide further comprises at least one fish attracting element.

* * * * *